United States Patent Office 3,279,940
Patented Oct. 18, 1966

3,279,940
POLYETHYLENE AND POLYPROPYLENE CONTAINERS COATED WITH A POLYESTER RESIN
William C. Francis, Overland Park, and Robert W. Hill, Leawood, Kans., and Joseph W. Jones, Jr., Kansas City, Mo., assignors, by mesne assignments, to Gulf Oil Corporation, Pittsburgh, Pa., a corporation of Pennsylvania
No Drawing. Filed May 13, 1963, Ser. No. 280,077
5 Claims. (Cl. 117—94)

This invention relates to the improvement of olefin polymer structures. More particularly, this invention is concerned with coatings on polyolefins which improve appearance, abrasion resistance, barrier properties, printability and other characteristics.

Olefin polymers, primarily as a result of low cost and ease of fabrication, have assumed an important position in the packaging field. Films of such materials as polyethylene and polypropylene are extruded and are then fabricated into bags or are used for wrapping of other containers. Bottles and even containers as large as drum liners may be fabricated by blow-molding techniques.

The extruded shapes of polyolefins, in general, have smooth, rather attractive surfaces, but are deficient with respect to buildup of static charges, printability and resistance to various solvents. The blow-molded articles are inclined to have surfaces which are not as smooth and attractive as desired, and in the case of bottles, are deficient from the standpoint of resistance to various solvents and to diffusion of vapors and liquids through the polymer.

Improvement of polyolefin structures with respect to these basic deficiencies is much desired. However, modification of the polyolefin to improve these properties has been only partially successful, and the application of coatings to polyolefins have involved troublesome procedures because of the difficulty of obtaining good adhesion.

It has now been discovered that the properties of polyolefin manufactured articles are greatly improved in many respects by coating thereon reactive polyester resins containing 2,4,6-trioxo-s-triazine groups, either alone or in combination with various resins, curing agents, pigments, dyes and other auxiliary components.

The reactive polyester resins which are suitable for this purpose have unique properties, among which is good adhesion to polyolefin surfaces. These resins, in their simplest form, are made by reacting together a 2,4,6-trioxo-s-triazine-1,3,5(2H,4H,6H)-trialkanoic acid with a polyhydric alcohol.

The proportions of reactants are normally chosen so as to provide an excess of hydroxy over carboxy groups and the condensation is carried to the point at which there is obtained a viscous resin. A resin of this type containing a substantial proportion of unreacted carboxy groups is easily dispersed or dissolved in aqueous media such as dilute ammonium hydroxide, so that coatings may be made from such a solution by conventional methods. These resins, in one embodiment of this invention, may be modified by inclusion of other carboxylic acids in the reaction mixture. This may be accomplished, for example, by reacting the triazinetrialkanoic acid with an aliphatic diol and a dicarboxylic acid.

After coating, the reactive polyester resins may be cured by heating to carry the condensation reaction more nearly to completion. Preferably, another reactive resin or other curing agent is incorporated in the coating formulation so as to facilitate curing at low temperatures with short curing times. Curing agents of the formaldehyde-donor type such as bishydroxymethylurea, hexamethoxymethylmelamine, trihydroxymethylmelamine and dihydroxymethyl ethyleneurea are particularly useful for this purpose. Another type of curing agent comprises unsaturated compounds such as methylenebisacrylamide, divinyl sulfone, methacrylic anhydride and acrylic anhydride. In general, known curing agents which are capable of reacting with hydroxy substituents are suitable.

Considerable variation is permissible in the difunctional alkylene structures of the reactants chosen for manufacture of the resin, the real limitations on molecular weight and extent of branching being largely matters of economy and convenience. The 2,4,6-trioxo-s-triazine-1,3,5-trialkanoic acid is most conveniently made by N-alkylation of s-triazine-2,4,6(1H,3H,5H)-trione, the availability of suitable alkylating agents at a reasonable price being the controlling factor. The most readily available tricarboxylic acids made by this technique are 2,4,6-trioxo-s-triazine-1,3,5(2H,4H,6H)tripropionic acid,

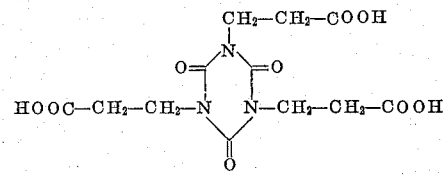

and 2,4,6-trioxo-s-triazine-1,3,5(2H,4H,6H)triacetic acid.

Various polyhydric alcohols may be reacted with the triazinetrialkanoic acids to yield polyester resins containing a substantial excess of hydroxy over carboxy groups. Among those which are suitable are the following: pentaerythritol, glycerol, trishydroxymethylethane, trishydroxymethylpropane, dipentaerythritol, sorbitol and xylitol. Of the polyhydric alcohols, however, the aliphatic diols are preferred.

Among the aliphatic diols which may be employed are the following: ethylene glycol, diethylene glycol, 1,3-propanediol, 1,2-propanediol, triethylene and tetraethylene glycols, 1,4-butanediol, 1,5-pentanediol, neopentyl glycol, 1,6-hexanediol and the like.

Among the dicarboxylic acids which may be employed are the following: succinic, maleic, glutaric, adipic, suberic, azelaic and alkyl-substituted derivatives of these acids. In addition, acids such as terephthalic and 1,4-cyclohexanedicarboxylic are also suitable.

The cost of the reactive polyester resins may be substantially reduced by inclusion of preferably a minor proportion of a cheap monocarboxylic acid in the reaction mixture. So as to maintain a substantial excess of hydroxy over carboxy substituent groups in the resin, a polyhydric alcohol such as pentaerythritol may be used along with the monocarboxylic acid. When tall oil fatty acids are included along with the dicarboxylic acid, for example, the resulting product is cheaper, and sometimes shows improvement in adhesion to certain polyolefin surfaces. In resins of this type in which a portion of the hydroxy groups are reacted with monocarboxylic acids, the resulting coatings are more easily penetrated by certain solvents. Although this is a disadvantage in barrier coatings for containers for a few liquid products, this property can be beneficial in undercoatings on which printing inks are applied.

The above-described resins are highly polar, hydrophilic materials. In view of this, it is surprising that they show excellent adhesion and affinity for the very non-polar, hydrophobic olefin polymers, such as linear polyethylene and polypropylene.

Blow-molded polyolefin bottles find use primarily in two types of applications, first in those applications in which the heavy weight and fragility of glass containers in the larger sizes give polyolefin containers a decided advantage, and second, in those applications in which novel, attractive containers of small size are used, such as for cosmetics. For many products in the cosmetic and chemical specialty field an unbreakable container is desired by consumers. Furthermore, the use of plastic bottles provides a great variety of possible combinations of color and surface texture for the designers of containers. In spite of the obvious appeal of polyolefin bottles for packaging cosmetics, in particular, however, fully half of these products must be marketed in containers made of glass, metal or other more impervious materials. In general, any gaseous or oily, non-aquous substance tends to diffuse through the walls of blow-molded polyolefin bottles. In many cosmetic products, such as lotions, the perfuming ingredients are quickly lost after packaging in polyolefin bottles. Likewise, in the case of foods and beverages, flavoring ingredients are lost by diffusion through polyolefin containers, thereby substantially altering the taste of the product. Permanent waving solutions spoil because of permeation of oxygen inward through the walls of polyolefin bottles, and through loss of ammonia from the solutions, by diffusion outward.

In a particularly advantageous and preferred embodiment, the present invention for the first time provides as an article of manufacture a container made of solid olefin polymer coated with a polyester reaction product of a 2,4,6-trioxo-s-triazine-1,3,5(2H, 4H, 6H)-trialkanoic acid with a polyhydric alcohol and containing therein at least one substance to which the olefin polymer is normally permeable, or a composition which is subject to deterioration on storage in an uncoated container as a consequence of the permeability of the olefin polymer.

The following specific examples are presented by way of illustration and not by way of limitation, so that those skilled in the art may better understand how the present invention may be practiced.

PREPARATION OF RESINS

Example 1

A mixture of 414 g. (1.2 mols) of 2,4,6-trioxo-s-triazine-1,3,5 (2H, 4H, 6H)-tripropionic acid and 292 g. (2.8 mols) of neopentyl glycol was heated 2 hr. at 120° C. Adipic acid (68.5 g., 0.4 mol) was added and heating was continued at 120–125° C. for 6 hr. and at 145–150° C. for 3 hr., giving a product with an acid No. of 50–55 (mg. KOH per g. of resin). The resin syrup was taken up in 1055 ml. of 1.5% aqueous ammonia to give a clear, colorless solution with no ammonia odor (40% resin solids).

Example 2

A mixture of 104 g. (0.3 mol) of 2,4,6-trioxo-s-triazine-1,3,5 (2H, 4H, 6H)-tripropionic acid, 53.3 g. (0.7 mol) of 1,2-propanediol and 14.6 g. (0.1 mol) of adipic acid was heated at 160° C. for 8 hr. to an acid number of 55 and was taken up in 164 ml. of 1.8% aqueous ammonia to give a clear, colorless solution of 50% resin content.

Example 3

A resin was prepared according to the procedure of Example 2, employing 104 g. (0.3 mol) of 2,4,6-trioxo-s-triazine-1,3,5 (2H, 4H, 6H)-tripropionic acid, 62.4 g. (0.6 mol) of neopentyl glycol, 14.6 g. (0.1 mol) of adipic acid, 13.6 g. (0.1 mol) of pentaerythritol and 28 g. (approx. 0.1 mol) of tall oil fatty acids. The resin syrup was taken up in 1.8% aqueous ammonia and diluted to 40% resin solids content.

Example 4

A mixture of 690 g. (2.0 mols) of 2,4,6-trioxo-s-triazine-1,3,5 (H, 4H, 6H)-tripropionic acid, 485.0 g. (4.66 mols) of neopentyl glycol and 97. 2 g. (0.67 mol) of adipic acid was heated for 6.5 hours at 145–150° C. to an acid number of 53.5 and was then diluted with a mixture of 1630 ml. of water and 110 ml. of concentrated (28%) ammonium hydroxide. The solids content of the resulting solution was 41%.

COATING OLEFIN POLYMERS

Example 5

An aqueous solution of 31.5% resin solids, of which 70% of the solids content was from the resin solution of Example 4 and 30% was hexamethoxymethyl melamine, was brush applied to an untreated (i.e., not flamed or otherwise oxidized) pint, polyethylene bottle. The polyethylene was of the linear type and was pigmented dark blue. The coated bottle was then cured for 30 min. at 250° F. The resulting film had good adhesion (flexing and adhesive tape test would not separate the film from the substrate), high gloss and anti-static properties (rubbing film would not produce surface charge sufficient to pick up ashes from ash tray).

Example 6

About forty natural polyethylene (density 0.948), 4-oz. Boston round bottles were flame treated and di-coated with an aqueous solution (33.6% total resin solids) of a blend of 70% resin solids supplied by the resin of Example 4 and 30% resin solids supplied by hexamethoxymethyl melamine. The coated bottles were baked 30 min. at 250° F. No flash-off time was necessary. The film was tack-free upon removal from the oven. Gloss, adhesion and antistatic properties were all very good.

Example 7

An Example 3 resin (40% r.s.)-hexamethoxymethyl melamine blend of 70/30 resin solids, respectively, was prepared by adding 15.0 g. of hexamethoxymethyl melamine to 87.0 g. of the resin solution of Example 3 and stirring until a clear, light yellow solution was obtained (about 5 min.). After dilution with 15 ml. of distilled water, to reduce viscosity, part of a blue, untreated polyethylene bottle was brush coated and baked 30 min. at 250° F. The resulting clear, tackfree coating had good gloss, adhesion and antistatic properties.

Example 8

Using the Example 3 resin blend, described in Example 7 above, twenty-eight 4-oz. Boston round bottles (clear P.E., density 0.948) were flamed and dip-coated. Twelve bottles were baked for 30 min. at 269° F., eight for 30 min. at 250° F. and eight for 60 min. at 250° F. All showed good gloss, adhesion and antistatic properties.

Example 9

Barrier properties for ethanol, turpentine, xylene, methyl isobutyl ketone, butyl acetate, acetic acid, n-heptane, and carbon tetrachloride were determined for blends of Example 4 and Example 3 resins described in Example 6 and Example 8 respectively above. The 4-oz. bottles were filled about ⅔ full, capped and placed in a circulating oven at 140° F. (60° C.) for 4 days. The weights of bottles and contents were recorded and the bottles were then stored for 2 weeks at room temperature. Weights were again recorded and percent weight loss both during 4 days at 140° F. and for the duration of the experiment was calculated for each bottle. The results appear in the table below. Of particular interest were the reduction in loss of turpentine, xylene, carbon tetrachloride, and n-heptane, the latter showing no loss from the coated bottle compared to 15.5% loss from the control. In most instances the Example 3 resin was comparable to Example 4, however, the Example 3 resin did not provide as good a barrier to xylene or carbon tetrachloride.

| Solvent | Control—Uncoated Bottles | | | | Coated Bottles of Example 6—Cured 30 min./250° F. | | | |
|---|---|---|---|---|---|---|---|---|
| | Solvent Wt., g. | | Solvent Loss | | Solvent Wt., g. | | Solvent Loss | |
| | Initial | Final | Grams | Percent | Initial | Final | Grams | Percent |
| Ethanol (Abs.) | 93.0 | [1] 92.7 | 0.3 | 0.3 | 70.1 | [1] 69.9 | 0.2 | 0.3 |
| | | [2] 92.8 | 0.2 | 0.2 | | [2] 69.9 | 0.2 | 0.3 |
| Turpentine | 104.0 | 100.9 | 3.1 | 3.0 | 87.4 | 87.3 | 0.1 | 0.1 |
| | | 99.9 | 4.1 | 4.0 | | 87.3 | 0.1 | 0.1 |
| Xylene | 97.2 | 73.6 | 23.6 | 24.3 | 92.1 | 84.9 | 7.2 | 7.8 |
| | | 59.2 | 38.0 | 39.1 | | 83.9 | 8.2 | 8.9 |
| Methyl-isobutylketone | 96.7 | 95.1 | 1.6 | 1.6 | 85.3 | 84.3 | 1.0 | 1.2 |
| | | 95.0 | 1.7 | 1.7 | | 84.3 | 1.0 | 1.2 |
| Butyl Acetate | 101.4 | 98.9 | 2.5 | 2.5 | 97.9 | 95.7 | 2.2 | 2.2 |
| | | 98.2 | 3.2 | 3.2 | | 95.1 | 2.8 | 2.8 |
| Acetic Acid (glacial) | 114.7 | 114.1 | 0.6 | 0.5 | 96.0 | 95.3 | 0.7 | 0.7 |
| | | 114.0 | 0.7 | 0.6 | | 95.4 | 0.6 | 0.6 |
| n-Heptane | 82.3 | 69.5 | 12.8 | 15.5 | 69.9 | 69.9 | 0 | 0 |
| | | 60.9 | 21.4 | 25.9 | | 69.8 | 0.1 | 0.1 |
| Carbon Tetrachloride | 188.4 | 146.6 | 41.8 | 22.2 | 133.1 | 127.1 | 6.0 | 4.5 |
| | | 127.6 | 50.8 | 27.0 | | 126.8 | 6.3 | 4.7 |

[1] After 4 days at 140° F.
[2] After 4 days at 140° F. and 2 weeks at room temperature.

*Example 10*

A small 6-oz. polypropylene (natural, unpigmented) bottle was flame treated and dip-coated with the resin blend described in Example 6 above. The film was cured 30 min. at 250° F. A clear, colorless coating resulted, having good gloss, adhesion, and antistatic properties.

The coating formulations exemplified above are all non-flammable aqueous solutions or dispersions, so that coating of a flammable polyolefin bottle or other structure possessing a high surface/mass ratio may be carried out without creating a fire hazard. This property of the coating resins possesses obvious practical advantages. It is, of course, possible to employ other solvents, such as alcohols, ketones and esters for preparation of coating solutions of these resins. The usefulness of the coated olefin polymers of this invention is readily apparent in view of the improved properties disclosed in the above examples. Many specific applications of these improved materials, as will occur to those who are skilled in the art, may be made without departing from the spirit and scope of this invention. Among these applications are included use of the resins in decorative coatings on toys, housewares, automotive parts, electrical parts and other useful articles.

What is claimed is:

1. An article of manufacture comprising a container made of solid linear polyethylene coated with a polyester reaction product of a 2,4,6-trioxo-s-triazine-1,3,5(2H,4H,6H)-trialkanoic acid with a polyhydric alcohol.

2. An article of manufacture comprising a container made of solid polypropylene coated with a polyester reaction product of a 2,4,6-trioxo-s-triazine-1,3,5(2H,4H,6H)-trialkanoic acid with a polyhydric alcohol.

3. An article of manufacture comprising a bottle made of solid linear polyethylene, coated with a polyester resin obtained by reacting together at an elevated temperature, 2,4,6-trioxo-s-triazine-1,3,5(2H,4H,6H)-tripropionic acid, neopentyl glycol and adipic acid, in combination with hexamethoxymelamine as a curing agent.

4. An article of manufacture comprising a bottle made of solid polypropylene coated with a polyester resin obtained by reacting together at an elevated temperature 2,4,6-trioxo-s-triazine-1,3,5(2H,4H,6H)-tripropionic acid, neopentyl glycol and adipic acid, in combination with hexamethoxymelamine as a curing agent.

5. An article of manufacture comprising a container made of solid linear polyethylene coated with a polyester resin obtained by reacting together at an elevated temperature 2,4,6-trioxo-s-triazine-1,3,5(2H,4H,6H)-tripropionic acid, neopentyl glycol, adipic acid, pentaerythritol and tall oil fatty acids, in combination with hexamethoxymelamine as a curing agent.

References Cited by the Examiner

UNITED STATES PATENTS

| | | | |
|---|---|---|---|
| 2,773,782 | 12/1956 | Hassel et al. | 117—161 X |
| 2,811,468 | 10/1957 | Joffre | 117—138.8 X |
| 2,860,801 | 11/1958 | Nielsen | 117—138.8 X |
| 2,999,772 | 9/1961 | Burk et al. | 117—138.8 |
| 3,070,462 | 12/1962 | McConnell et al. | 117—138.8 |
| 3,132,142 | 5/1964 | Hopkins | 260—248 |
| 3,141,825 | 7/1964 | Goldemberg et al. | 206—8 X |
| 3,184,438 | 5/1965 | Phillips et al. | 240—248 X |
| 3,199,701 | 8/1965 | Santelli | 215—1.5 |

FOREIGN PATENTS 3,115,479  12/1963  Germany.

WILLIAM D. MARTIN, *Primary Examiner.*

R. HUSACK, *Assistant Examiner.*